March 28, 1939. G. T. LINDSTROM 2,152,552
COMBINED FRICTION AND POSITIVE CLUTCH
Filed Jan. 11, 1938 3 Sheets-Sheet 1
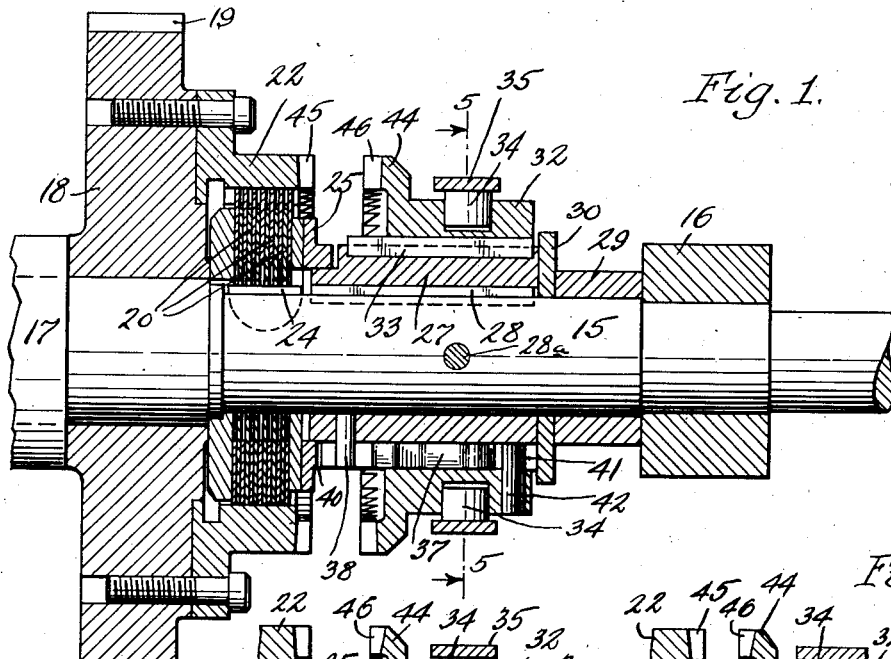
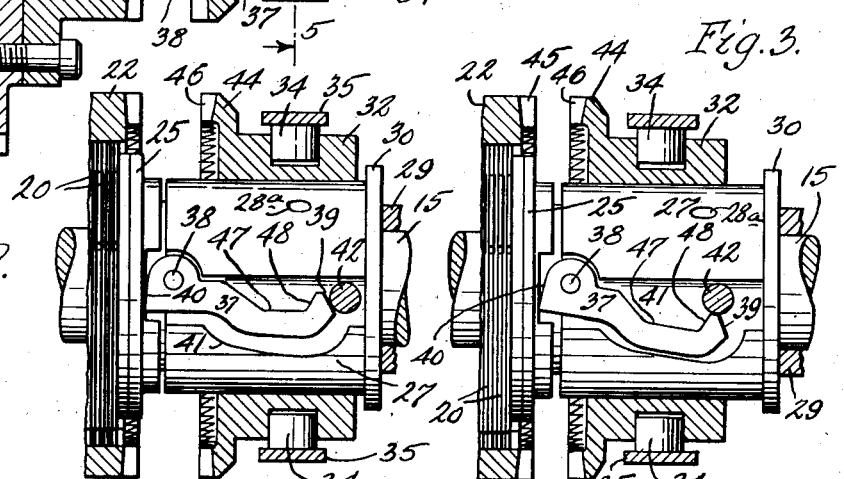
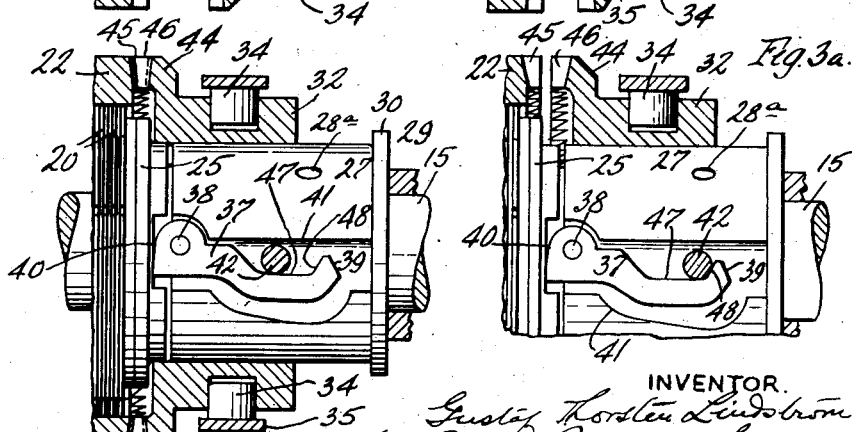
INVENTOR.
Gustaf Torsten Lindstrom
by Parker, Brockrow & Farmer.
ATTORNEYS March 28, 1939. G. T. LINDSTROM 2,152,552
COMBINED FRICTION AND POSITIVE CLUTCH
Filed Jan. 11, 1938 3 Sheets-Sheet 2
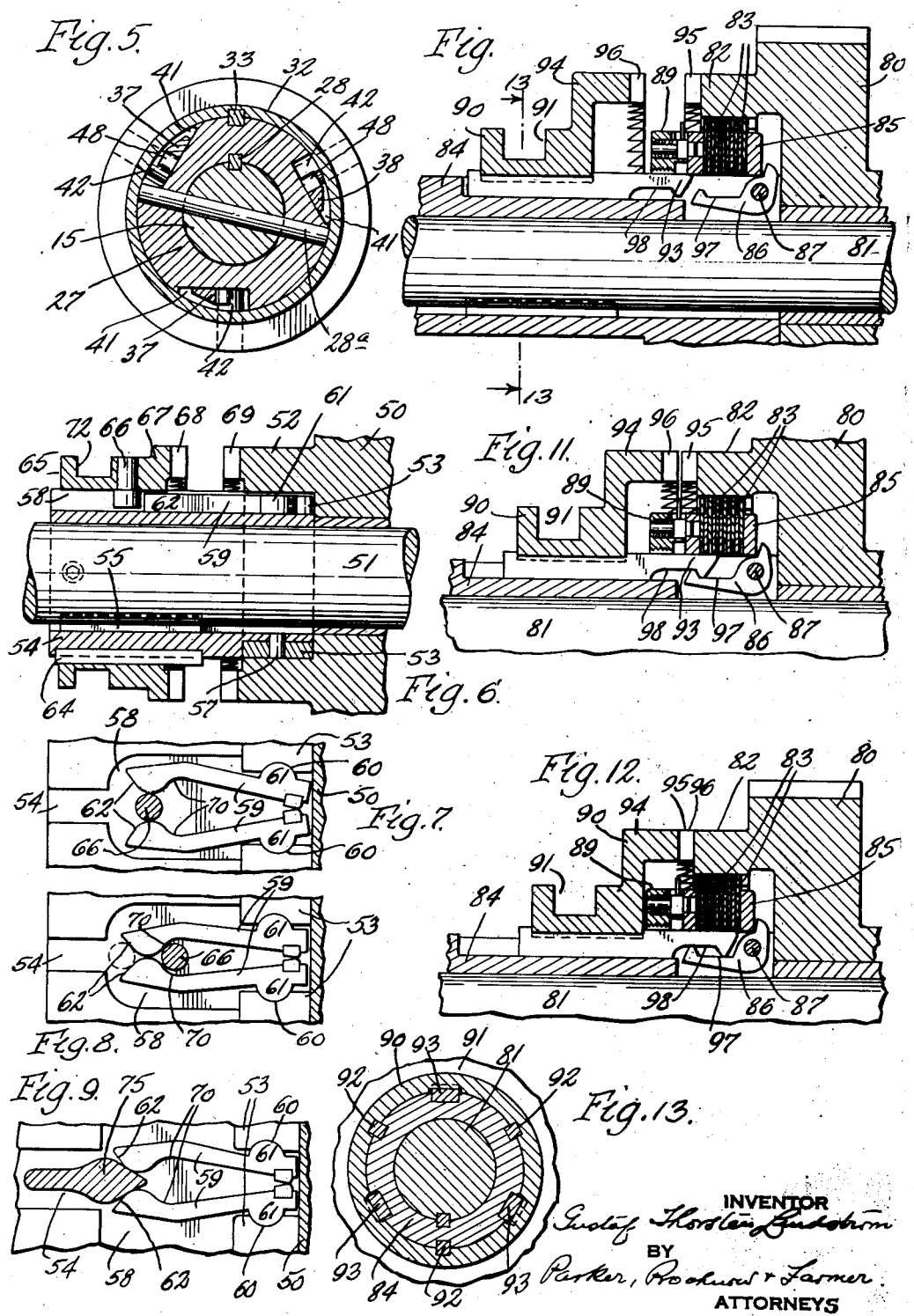

March 28, 1939. G. T. LINDSTROM 2,152,552
COMBINED FRICTION AND POSITIVE CLUTCH
Filed Jan. 11, 1938 3 Sheets-Sheet 3

INVENTOR.
Gustaf Thorsten Lindstrom
By Parker, Brockwow & Farmer.
ATTORNEYS.

Patented Mar. 28, 1939

2,152,552

UNITED STATES PATENT OFFICE 2,152,552

COMBINED FRICTION AND POSITIVE CLUTCH

Gustaf Thorsten Lindstrom, Tonawanda, N. Y.

Application January 11, 1938, Serial No. 184,450

3 Claims. (Cl. 192—53)

This invention relates to improvements in clutches for transmitting power from one shaft to another, and particularly to clutches of this type provided with both frictional faces and positively engaging parts.

One of the objects of this invention is to provide means whereby friction clutches of standard construction can be readily provided with means for positively connecting two rotating members.

Another object is to provide mechanism of improved construction for providing a positive driving connection between two rotating parts after the parts have been brought to approximately the same speed by the frictional driving connection.

Another object is to provide a mechanism including a lever which urges the frictional parts into engagement and which is released to permit disengagement of the frictional parts before the positively engaging parts of the clutch are moved into engaging positions.

It is also an object of this invention to provide a friction clutch with a slidable clutch shifting element which has teeth or the like to form a positive driving connection between the driving and driven members. Also to provide a friction clutch in which the slidable clutch shifting element forms a part of the positive connection between the driving and driven members.

A further object is to provide means whereby friction clutches of standard and accepted constructions can, with comparatively few and minor structural changes, be made into combined friction and positive drive clutches.

Other objects of this invention will appear from the following description and claims.

In the accompanying drawings:

Fig. 1 is a longitudinal central sectional view of one form of combined friction and positive clutch embodying this invention.

Figs. 2, 3, 3a, and 4 are fragmentary views, partly in section, of the clutch shown in Fig. 1 and showing the parts in successively different positions.

Fig. 5 is a transverse section thereof, on line 5—5, Fig. 1.

Fig. 6 is a fragmentary longitudinal central sectional view of a combined friction and positive clutch of modified construction.

Figs. 7 and 8 are fragmentary face views of portions thereof.

Fig. 9 is a corresponding face view of a slightly modified construction.

Fig. 10 is a fragmentary longitudinal central sectional view of still another friction clutch having my invention applied thereto.

Figs. 11 and 12 are views similar to Fig. 10, but showing parts of the clutch in different positions.

Fig. 13 is a transverse section thereof, on line 13—13, Fig. 10.

Figure 14:
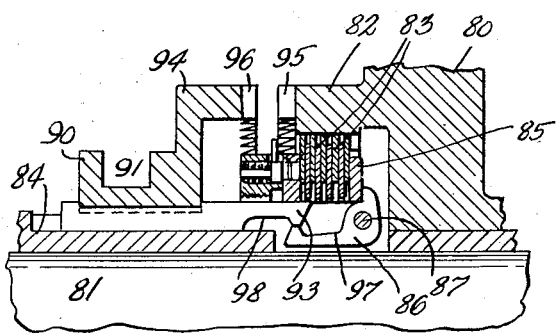
Fig. 14 is a section similar to Fig. 10, showing the position which the clutch parts assume in moving from the relation shown in Fig. 11 to that illustrated in Fig. 12.

I have illustrated by way of example several well known types of friction clutches to which I have applied improvements embodying this invention for the purpose of combining with these friction clutches positive connections between the driving and driven members. In many instances where friction clutches are employed, for example in the textile industry, it is frequently very desirable to have a positive connection between the driving and driven members, since even slight slippage of a friction clutch will result in defects in the product. In accordance with my improvements, the friction clutches are employed only for bringing the driven member approximately to the speed of rotation of the driving member, whereafter upon further movement of the clutch shipper, the pressure on the friction clutch is released and a positive connection between the driving and driven members is made.

In Figs. 1 to 5, I have illustrated my invention applied to one well known type of friction clutch. In this construction, 15 represents a shaft which is journalled in bearings 16 and 17 and which may form the driven member of the clutch.

A gear 18 having gear teeth 19 may constitute the driving member of the clutch and this member is mounted to rotate freely upon the shaft 15.

The frictional driving connection between the driving and driven members is formed in the usual manner by means of a plurality of friction disks 20, alternate disks being splined to the interior face of a ring-shaped member 22 bolted or otherwise secured on the driving gear 18, the other disks being splined to the shaft 15 as indicated at 24. Consequently, when these disks are pressed into contact with each other, power is transmitted through the ring-shaped member from the driving gear 18 to the shaft 15, and when the pressure on the disks is released, the driven disks connected with the ring-shaped member 22 rotate with the driving gear 18 and relatively to the disks splined to the driven member or shaft 15, so that the transmission of power from the driving member to the shaft 15 is interrupted. In this clutch, as well as in other friction clutches herein described, it will be obvious that, if desired, the driven member may be employed as the driving member, in which case the member herein described as the driving member, becomes the driven member.

In this particular type of clutch, pressure is applied to the disks through the medium of a compression ring 25 which is mounted to rotate with and to slide lengthwise of a clutch hub or sleeve 27 rigidly secured on the shaft 15, for example, by means of a key 26 and pin 26a. The clutch hub is suitably positioned with reference to the bearing 16 in any suitable manner, for example, by means of a spacer collar 29 and a stop washer 30. A sliding member or element 32 is splined to the clutch hub 27 by means of a spline 33 and this sliding element may be actuated in any suitable or desired manner, for example, by means of shifter studs 34 extending into an annular groove formed in the outer face of the sliding element and connected to a shifter lever or shipper 35, only portions of which are shown in Figs. 1 to 4.

Pressure is applied to the pressure ring 25 of the clutch by means of a series of levers 37 pivoted at 38 on the clutch hub and having cam faces 39 by means of which the levers may be swung about their pivots 38, three levers being shown in the construction illustrated, see Fig. 5. The levers also have shoulders or cam faces 40 engaging the pressure ring 25 so that when the levers are swung from their normal positions in which they apply no pressure to the clutch, as shown in Fig. 2, to the position shown in Fig. 3, the clutch disks will be pressed into engagement with each other to establish a driving connection between the gear 18 and the shaft 15. These levers 37 are preferably mounted in recesses 41 formed in the peripheral face of the clutch hub 27, and movement is imparted to the levers 37 by means of pins or studs 42, rigidly secured on the sliding member or element 32, one of these pins extending into each recess 41.

The operation of this type of friction clutch will be obvious, since the movement of the sliding element 32 to the left in Figs. 1 to 4 will result in the pins 42 engaging the cam portions 39 of the levers 37 and thus causing the projections or cams 40 of the levers to move the compression ring 25 into a position to compress the friction disks, and upon reverse movement of the sliding element 32 the pressure on the friction disks is released so that no power is transmitted by means of the clutch. All of the parts thus far described have heretofore been employed in friction clutches and of themselves constitute no part of this invention.

In order to adapt a friction clutch of this type to provide a positive connection between the driving and driven members, I provide inter-engaging teeth or projections on parts connected with the driving and driven members. These teeth enter into engagement after the maximum pressure has been exerted on the friction disks by the levers 37. I further provide for relieving the pressure on the friction disks so as to permit relative movement of the teeth carrying members, so that the teeth or projections of these two members may enter into correct engagement.

I have also found that in many friction clutches now on the market, teeth or other members for positive engagement with the driving member may be formed on the sliding element or member which is actuated by the shipper lever and which acts on the levers which move the friction disks into frictional contact. The sliding elements or members of such clutches are generally splined to sleeves which are keyed or otherwise fixed on the driven shafts and consequently, power can readily be transmitted to a driven member from this sliding element or member. Furthermore, these sliding elements generally have portions which extend into proximity to the driving member, and consequently, by adding a flange or extension to the sliding member on which the teeth may be formed, a positive connection can be readily provided on friction clutches, such as now in common use with comparatively few changes in the construction of such clutches.

In the particular embodiment of my invention illustrated in Figs. 1 to 5, I have provided the sliding element or member with an extension or flange 44, the outer edge of which extends near the ring-shaped extension 22 of the driving member 19. Consequently, I provide a series of teeth 45 on the ring-shaped extension 22 of the driving member, and corresponding teeth 46 on the flange 44 of the sliding element 32. These teeth may be of any suitable or desired shape and are arranged so that they become interlocked when the sliding element 32 is moved to the limit of its movement to the left in Figs. 1 to 4, as shown in Fig. 4.

Since a correct and positive engagement of the interlocking teeth takes place only if the teeth on the sliding element are in correct relation to the teeth 45 on the driving member, I provide means for releasing the pressure on the friction disks just prior to the engagement of the teeth 46 with the teeth 45. I accomplish this by providing the pressure levers 37 with a recessed or relieved portion or cam 47 which joins the cam face 39 of the levers, as clearly shown in Figs. 2 to 4, the cam faces or depressions 47 being provided with inclined portions 48 which extend from the depressed portions 47 to the cam faces 39.

As a result of this construction, it will be clearly seen by reference to Figs. 2 to 4, that as the sliding member 32 is moved to the left from the position shown in Fig. 2, in which the friction disks are out of driving contact, the pins or studs 42, of the sliding element first engage the cam face 39 and swing the levers 47 into the positions shown in Fig. 3 in which they press the friction disks into driving contact. This results in the frictional transmission of power from the driving member 18 to the driven shaft 15, which shaft is then accelerated until it acquires substantially the speed of the driving member. As soon as this has been accomplished, the shifter lever 35 is moved further to move the sliding element 32 further to the left, whereupon the pins 42 engage the faces 48 which are inclined oppositely to the faces 39. This permits the levers 37 to move back into the positions in which pressure on the friction disks is released, and also causes the teeth 46 of the member to move to a position just clearing the teeth 45 of the driving element, see Fig. 3a. Upon further movement of the sliding element to the left, the teeth 46 are moved into engagement with the teeth 45, the pins 42 during this movement travelling along the substantially flat portion 47 at the bottom of the cam depression in each lever 37, see Fig. 4.

If, during the driving of the shaft 15 through the friction disks, the teeth 46 should not be in correct relation to the teeth 45 to enter into the recesses between these teeth, then by relieving the pressure on the friction disks, the driven member or shaft 15 will tend to lag behind the driving member sufficiently to permit the teeth 46 to be engaged into correct relation between the teeth 45. A positive driving connection between the driving and driven members is, consequently, formed by these teeth and during the period in which the positive drive connection is in operation, pressure on the friction disks is relieved. This results not only in a positive and accurate driving of the driven member at the same speed as the driving member, but also relieves the friction disks of any work or movement relatively to each other, so that the life of the frictional power transmission portion of the clutch is greatly increased.

In the construction shown in Figs. 6 to 9, a somewhat different type of friction clutch is illustrated. In this construction, a member 50 which may be the driving member is rotatably mounted on a shaft 51 which constitutes the driven member. The driving member 50 is provided at one side thereof with an outwardly extending flange or hub portion 52, the inner surface of which is adapted to cooperate with an expanding band 53. 54 represents a clutch hub or sleeve arranged about the shaft 51 and secured thereto by one or more keys 55. This clutch hub or sleeve has the expanding band 53 connected therewith in any suitable manner, for example, by means of a pin 57, and this hub or sleeve is provided with recessed portions 58 in which expanding levers or fingers 59 are arranged. These levers or fingers extend between and engage the ends of the expanding band 53, the ends of the band for this purpose being provided with arc-shaped recesses 60 into which correspondingly shaped bosses or projections 61 of the levers 59 enter. The portions of the levers arranged between the ends of the expanding band 53 are in engagement with each other and the opposite ends of the levers are provided with cam faces 62. When these ends of the levers are spread apart, as shown in Fig. 7, the band 53 will be expanded into frictional engagement with the inner surfaces of the flange 52, and thus form a driving connection between the driving member 50 and the shaft 51.

Actuation of the levers 59 is accomplished by means of a slidable element or member 65 secured against rotation relatively to the clutch hub or sleeve 54 by means of one or more splines 64. The slidable element has a pin or stud 66 extending into the recess 58 for actuating the levers 59, as has been described. All of these parts of the clutch have heretofore been known and of themselves constitute no part of this invention.

In order to provide for a positive connection between the driving and driven members of this clutch, I provide positive inter-engaging teeth on the driving member 50 and on the sliding member 65. For example, in the construction shown in Figs. 6 to 9, I have provided the sliding member with a flange 67 on which is provided one set of teeth 68. A corresponding set of teeth 69 is provided on the hub 52 of the driving member 50. Consequently, when the sliding element is moved to the limit of its movement to the right in Fig. 6, the teeth 68 will engage between the teeth 69 to form a positive driving connection from the driving member 50 to the sliding element 65, and from the element to the clutch hub or sleeve 54, through the spline 64, and from this clutch hub to the driven shaft through the keys 55.

In order to relieve the friction connection just prior to the engagement of the teeth 68 and 6., I have provided recessed or depressed cam faces 70 on the edges of the levers 59 which face each other. These cam faces are so formed that after the levers 59 have been spread apart to their maximum extent by means of the pin or stud 66 engaging the cam faces 62, this pin or stud enters into the oppositely facing depressed portions or cam faces 70 and this permits the levers 59 to move from the position shown in Fig. 7 to those shown in Fig. 8, thus permitting the expanding band 53 to return to its normal position out of driving engagement with the inner face of the flange or hub 52. It will, consequently, be obvious that when the sliding element or member 65 is moved to the right from the position shown in Fig. 6, the operator preferably stops the shifting lever momentarily while the pin 66 is in the position shown in Fig. 7, and after the members 50 and 51 have acquired approximately the same speeds, the slidable member 65 is moved farther to the right, which first relieves the pressure on the expanding band 53 and then moves the teeth 68 into engagement with the teeth 69.

It will be understood that the sliding member 65 may be actuated in any suitable manner, and in the construction illustrated an annular groove 72 is provided on its outer surface into which the usual shifter studs (not shown) may extend.

In Fig. 9, I have shown a slight modification of the clutch described in Figs. 6 to 8, namely, that I have replaced the pin 66 by means of a cam-shaped member 75 carried on the inner face of the sliding element or member 65 and engaging with the cam faces of the levers 59 in the same manner as the pin 66.

In Figs. 10 to 14 inclusive is shown another type of friction clutch in which a driving member 80 is rotatably mounted on the driven shaft 81. The member 80 has an annular flange or hub portion 82 within which friction disks 83 are arranged, alternate disks being splined to the inner face of the flange or hub portion 82 and the remaining disks being splined to a clutch hub or sleeve 84 suitably keyed or otherwise rigidly secured to the shaft 81. In this construction, the friction disks may be pressed toward each other by means of a compression ring 85 and a series of levers 86 each pivoted at 87 on a recessed portion of the clutch hub or sleeve 84. The pressure against these disks is resisted at the opposite side thereof by means of an annular adjustable member 89 mounted on the clutch hub or sleeve 84.

The friction clutch is actuated by means of a sliding element or member 90 having an annular groove 91 for a clutch shipper (not shown). The slidable element is slidably arranged on the clutch hub or sleeve 84 in any suitable manner, preferably by means of a splined connection with suitable keys 92 (Fig. 13). The slidable element is also provided with cam fingers 93 which are rigidly secured to the inner cylindrical surface of the sliding member 90 and engage the levers 86 for swinging the same from the inoperative position shown in Fig. 10 to an operative position shown in Fig. 14. The construction of Figs. 10 to 14 thus far described is well known and by itself does not constitute a part of this invention.

In accordance with my invention, I provide the slidable member 90 with a flange or extension 94, the outer edge of which extends into proximity to hub 82 of the driving member. I also provide cooperating teeth 95 and 96 respectively on the hub 82 of the driving member 80 and on the flange 94 of the sliding element or member 90, the teeth being so arranged as to move into engagement during the final movement of the member 90 to the right in Figs. 10 to 12 and 14.

I also recess or undercut the arms of the levers 86 which are engaged by the cam fingers, to form cam or pressure relieving faces 97 thereon. I also provide notched or cam faces 98 on the lever-engaging sides of the cam fingers 93 which act in such a manner that if the sliding element or member 90 is moved to the right beyond the position shown in Fig. 14, the relieved or cam portions 97 and 98 will cooperate to permit the levers 86 to swing back from their maximum pressure applying positions shown in Fig. 14, and thus relieve the friction disks and permit slipping or relative movement of the driving and driven members of the clutch which allows the proper meshing of the teeth 95 and 96.

Figure 15:
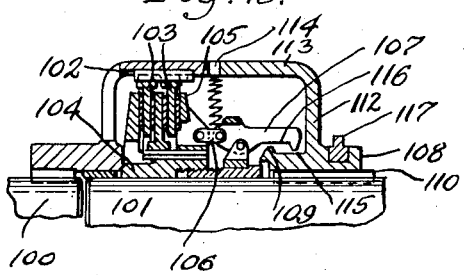
Fig. 15 is a fragmentary longitudinal central sectional view of another type of friction clutch having the improvements embodying this invention applied thereto.

In Fig. 15 is illustrated another form of friction clutch to which I have applied my improvements. In this type of clutch, the shaft 100 may be the driving member and the shaft 101 the driven member. The shaft 100 has keyed thereto a clutch housing or enlarged hub 102 on which alternate clutch disks 103 are secured. The remaining clutch disks are connected with or splined to a clutch sleeve or hub 104. This sleeve or hub also carries a pressure applying ring or member 105 which is actuated through links 106 by means of levers 107, only one link and one lever being shown in Fig. 15. The slidable clutch actuating member or element in this case is the part 108 which also has a cam face 109 adapted to engage an end of each lever 107, this sliding member being slidably mounted on the driven shaft 101 by means of a spline 110.

Since in this type of friction clutch, the hub or sleeve part of the slidable member 108 does not extend into proximity to the driven member, I have provided the slidable member 108 with an annular flange on the hub thereof which extends into proximity to the housing part 102. This extension includes an outwardly extending portion 112 and a circumferentially extending flange or portion 113. The outer end of this flange 113 extends into proximity to the end of the housing part 102 and cooperating teeth 114 are provided on the flange 113 and the housing part 102 so that when the slidable member is moved to the limit of its motion toward the driving shaft 100, the teeth on the flange 113 will engage with the teeth of the housing part 102 to form a positive driving connection from the driving shaft 101 and the housing part 102. This extension of the slidable member, also cooperates with the housing part 102 to form a housing enclosing the friction clutch.

In order to disengage the friction disks when the teeth 114 move into engagement, I provide on the inner face of the sliding member 108 a recess or depression 115, and I also relieve or indent the portion 116 of the inner faces of the levers 107 so that the ends of the levers 107 may enter into the recess or depression 115 and thus permit the levers to swing into positions to relieve pressure on the friction disks.

It will be obvious that in the operation of this clutch by movement of the sliding member or element 108 from released or disengaged portion toward the driving member, the levers 107 will first be swung by the cam members 109 into positions to apply the maximum pressure to the friction disks, and upon further movement of the sliding element 108 in the same direction, the ends of the levers 107 will enter the depression 115, so that pressure on the friction members is relieved. The teeth 114 can then be readily moved into engagement to form a positive driving connection between the shafts 100 and 101 through the housing member 102, and slidable member 108.

117 represents the usual shipper for moving the slidable member lengthwise of the shaft 101.

In all of the constructions described, it will be noted that positive drive is effected through the usual clutch shifting slidable member and that by means of my improvements, various types of friction clutches now on the market can be readily converted into combined friction and positive clutches. This can be done with very little change in the construction of the slidable member, and by relieving the usual pressure levers, and in some cases also the cams or parts actuating them, in such a manner that the frictional transmission of power is interrupted just prior to engagement of the positive driving members or teeth. By means of my improvements, I not only produce clutches which can be absolutely relied upon to transmit power positively and without slippage from the driving member, but also I greatly increase the life of the clutches by rendering the frictional drives inoperative except during starting.

It will also be noted that in all of the forms of my invention shown, the extension of the slideable member extends about portions of the friction clutch mechanisms, and when the clutches are in engaged positions, they are entirely enclosed so that the clutch mechanisms are protected from damage from the exteriors thereof.

I claim as my invention:

1. A combined friction and positive drive clutch having the combination with a driving rotary member and a driven rotary member, a plurality of cooperating clutch disks on said members movable into and out of frictional engagement, a sleeve fixed on one of said members, and a collar slidable on and rotatable with said sleeve, of sets of circumferential opposed teeth on one of said members and on said collar respectively, which are normally disengaged and which, upon travel of said collar to a predetermined position in one direction, engage to form a positive drive connection between said rotary members, a lever pivoted on said sleeve, a cam face on said lever, a pin on said collar which, as said collar travels toward tooth engaging position, engages said cam and swings said lever to a position in which it presses said friction disks together and effects frictional drive connection between said two rotary members, said lever having a second cam face opposed to said other cam face, which, as said pin leaves said first cam face in the continued travel of said collar, engages said pin and permits said lever to swing in an opposite direction by action of said friction disks as a result of their tendency to separate when relieved of said pressure, thus de-clutching said driving and driven members from frictional drive while they continue to rotate at substantially the same speed, and whereupon, by the continued movement of said collar its travel in said beforementioned direction will be completed and said sets of teeth will engage to effect positive drive connection between said driving and driven members while said friction drive connection remains inoperative.

2. A combined friction and positive drive clutch having the combination with a driving rotary member and a driven rotary member, a plurality of cooperating clutch disks on said members movable into and out of frictional engagement, a sleeve fixed on one of said members, and a collar slidable on and rotatable with said sleeve, of sets of circumferential opposed teeth on one of said members and on said collar respectively which are normally disengaged and which, upon travel of said collar to a predetermined position in one direction, engage to form a positive drive connection between said rotary members, a plurality of levers pivoted on said sleeve in equally spaced, circumferential relation and each having a part movable into a position to press said friction disks together and effect frictional drive connection between said two rotary members, a cam face on each lever, a set of symmetrically arranged pins fixed on said collar adjacent said levers and each of which, upon movement of said collar towards said position, engages the cam of an adjacent lever and swings that lever into position for applying the aforesaid pressure to said friction disks, each of said levers having a relief recess into which the adjacent pin is received after said pin has passed over the cam of that lever and whereby said levers are swung in an opposite direction by action of said friction disks as a result of their tendency to separate when relieved of pressure, thus de-clutching said driving and driven members, said teeth on said one member and on said collar being then engageable by continued movement of said collar in the same direction and while said friction drive is inoperative, and means for effecting said predetermined travel of said collar and full engagement of said sets of teeth, and said pins being arranged in definite relationship to said lever cams and to said driving and driven members so that the positive engagement of said members is unaffected by wear between said friction disks.

3. A combined friction and positive drive clutch for use at high speeds having the combination with a driving rotary member and a driven rotary member disposed in axial alinement and each being of symmetrical form with relation to its axis, a plurality of cooperating clutch disks on said members and in symmetrical relation to their axes and which are movable into and out of frictional engagement, a concentric sleeve fixed on one of said members and a concentric collar slidable on and rotatable with said sleeve, of sets of circumferential, opposed teeth on one of said members and on said collar respectively which are normally disengaged and which, upon travel of said collar to a predetermined position in one direction, engage to form a positive drive connection between said rotary members, a plurality of equally spaced, radially disposed pivots on said sleeve, a corresponding number of levers mounted on said pivots in symmetrical, dynamically balanced relation to the axis of said clutch to swing tangentially to the circumference of said sleeve and each having a part movable into a position to press said friction disks together to effect frictional drive connection between said two rotary members, a cam face on each lever, a set of symmetrically arranged pins fixed on said collar adjacent said levers and each of which, upon movement of said collar toward tooth engaging position, engages a cam of an adjacent lever and swings said lever into position for applying the aforesaid pressure to said friction disks, each of said levers also having a second cam terminating in a relief recess, so disposed that, after the respective pins have passed over said first cams in the continued travel of said collar, said levers are caused to engage the second cams with said pins and swing to pressure relieving position with respect to said friction disks and said pins thenceforth moving in said lever recesses during the completion of the collar to positive tooth engaging position, whereby positive drive engagement of said clutch members is effected while said friction drive connection is inoperative, and said members, said sleeve, said collar, said pins and said levers being symmetrically disposed in dynamic balance with respect to the clutch axis so that said clutch may run at high speeds without detriment to its operation by centrifugal influence.

GUSTAF THORSTEN LINDSTROM.